(12) United States Patent
Libra

(10) Patent No.: US 11,355,959 B2
(45) Date of Patent: *Jun. 7, 2022

(54) SOLAR ELECTRIC HYBRID BACKUP POWER SYSTEM

(71) Applicant: William J. Libra, Arvada, CO (US)

(72) Inventor: William J. Libra, Arvada, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/249,007

(22) Filed: Feb. 17, 2021

(65) Prior Publication Data

US 2021/0184493 A1 Jun. 17, 2021

Related U.S. Application Data

(63) Continuation of application No. 16/371,995, filed on Apr. 1, 2019, now Pat. No. 10,951,058.

(60) Provisional application No. 62/651,862, filed on Apr. 3, 2018.

(51) Int. Cl.
| | |
|---|---|
| *H02J 3/38* | (2006.01) |
| *H02J 9/08* | (2006.01) |
| *H02S 10/40* | (2014.01) |
| *H02J 7/00* | (2006.01) |
| *H02S 40/38* | (2014.01) |
| *H02J 7/35* | (2006.01) |

(52) U.S. Cl.
CPC ............... *H02J 9/08* (2013.01); *H02J 3/38* (2013.01); *H02J 3/383* (2013.01); *H02J 7/007* (2013.01); *H02J 7/0026* (2013.01); *H02J 7/0029* (2013.01); *H02J 7/0063* (2013.01); *H02J 7/35* (2013.01); *H02S 10/40* (2014.12); *H02S 40/38* (2014.12)

(58) Field of Classification Search
CPC ...... H02J 9/08; H02J 3/38; H02J 3/383; H02J 7/0026; H02J 7/0029; H02J 7/0063; H02J 7/007; H02J 7/35; H02S 10/40; H02S 40/38

See application file for complete search history.

(56) References Cited

U.S. PATENT DOCUMENTS

| | | |
|---|---|---|
| 6,201,181 B1 | 3/2001 | Azzam et al. |
| 6,396,239 B1 | 5/2002 | Benn et al. |
| 6,974,904 B2 | 12/2005 | Azzam et al. |
| 7,388,348 B2 | 6/2008 | Mattichak |
| 7,492,120 B2 | 2/2009 | Benn et al. |
| 7,566,991 B2 | 7/2009 | Blackman |
| 8,120,308 B2 | 2/2012 | Ward |
| 8,203,237 B1 | 6/2012 | Cowles |
| 9,735,718 B2 | 8/2017 | Grafling |
| 9,768,632 B2 | 9/2017 | Mitri |

(Continued)

*Primary Examiner* — Dinh T Le
(74) *Attorney, Agent, or Firm* — Trenner Law Firm, LLC; Mark D. Trenner

(57) ABSTRACT

A device for supplying electrical power including one or more photovoltaic panels includes one or more photovoltaic panels configured to generate electricity. The example device also includes an electric motor electrically operated by electricity generated by the one or more photovoltaic panels, and a generator mechanically coupled to the electric motor. A positive bus bar and negative bus bar are electrically coupled to the generator. At least one secondary battery is electrically coupled to the positive bus bar and negative bus bar. At least one electrical outlet is electrically coupled to the positive bus bar and negative bus bar.

20 Claims, 5 Drawing Sheets

(56) References Cited

U.S. PATENT DOCUMENTS

| | | | |
|---|---|---|---|
| 9,797,566 B2 | 10/2017 | Souvandy | |
| 10,498,209 B2 | 12/2019 | Shamoto | |
| 10,581,252 B2 * | 3/2020 | Clay | H02J 7/0013 |
| 2016/0285304 A1 | 9/2016 | Stiefel | |
| 2017/0359010 A1 * | 12/2017 | Rozman | H02P 9/02 |

* cited by examiner

SOLAR ELECTRIC HYBRID BACKUP POWER SYSTEM

CROSS REFERENCE TO RELATED APPLICATIONS

This application is a continuation of U.S. patent application Ser. No. 16/371,995 filed Apr. 1, 2019 for "Solar Electric Backup Power System" which claims the priority benefit of U.S. Provisional Patent Application No. 62/651,862 filed Apr. 3, 2018 for "Solar Electric Hybrid Backup Power System," each hereby incorporated by reference in its entirety as though fully set forth herein.

BACKGROUND

During power failures, homes and other buildings experience a need for backup electricity. Off-grid buildings, and vehicles such as recreational vehicles (RVs), experience this need as an ongoing issue. Solar panels are not able to provide electricity when there is insufficient sunlight (e.g., at night or during cloudiness). Therefore, backup power is typically provided by gasoline or diesel generators. These generators may also be used to charge batteries, which can be used to supply DC power for lighting and automotive use, or which can be attached to an inverter to supply 110-volt AC power for household use.

DETAILED DESCRIPTION

A solar electric hybrid backup power system is disclosed. An example of the solar electric hybrid backup power system is capable of supplying backup electrical power (e.g., during electrical blackouts or brownouts). The example solar electric hybrid backup power system may also be implemented for supplying primary electrical power (e.g., to off-grid buildings, at campsites, for recreational vehicles and campers, to name only a few examples).

The example solar electric hybrid backup power system may be implemented to harvest solar energy in the form of electricity, store electricity in batteries, and release stored electricity in consumer-usable formats, such as but not limited to, conventional 110VAC and 220VAC electrical outlets.

Within the limits of storage and retrieval efficiency, the system is capable of storing significant amounts of energy, and of delivering stored energy at significantly higher wattage than the electricity is initially collected via solar panels.

In an example, the solar electric hybrid backup power system may be attached to buildings (for example, in flood-proof locations) or to vehicles such as recreational vehicles (RVs), or may be deployed at campsites.

Before continuing, it is noted that as used herein, the terms "includes" and "including" mean, but is not limited to, "includes" or "including" and "includes at least" or "including at least." The term "based on" means "based on" and "based at least in part on."

Figure 1:
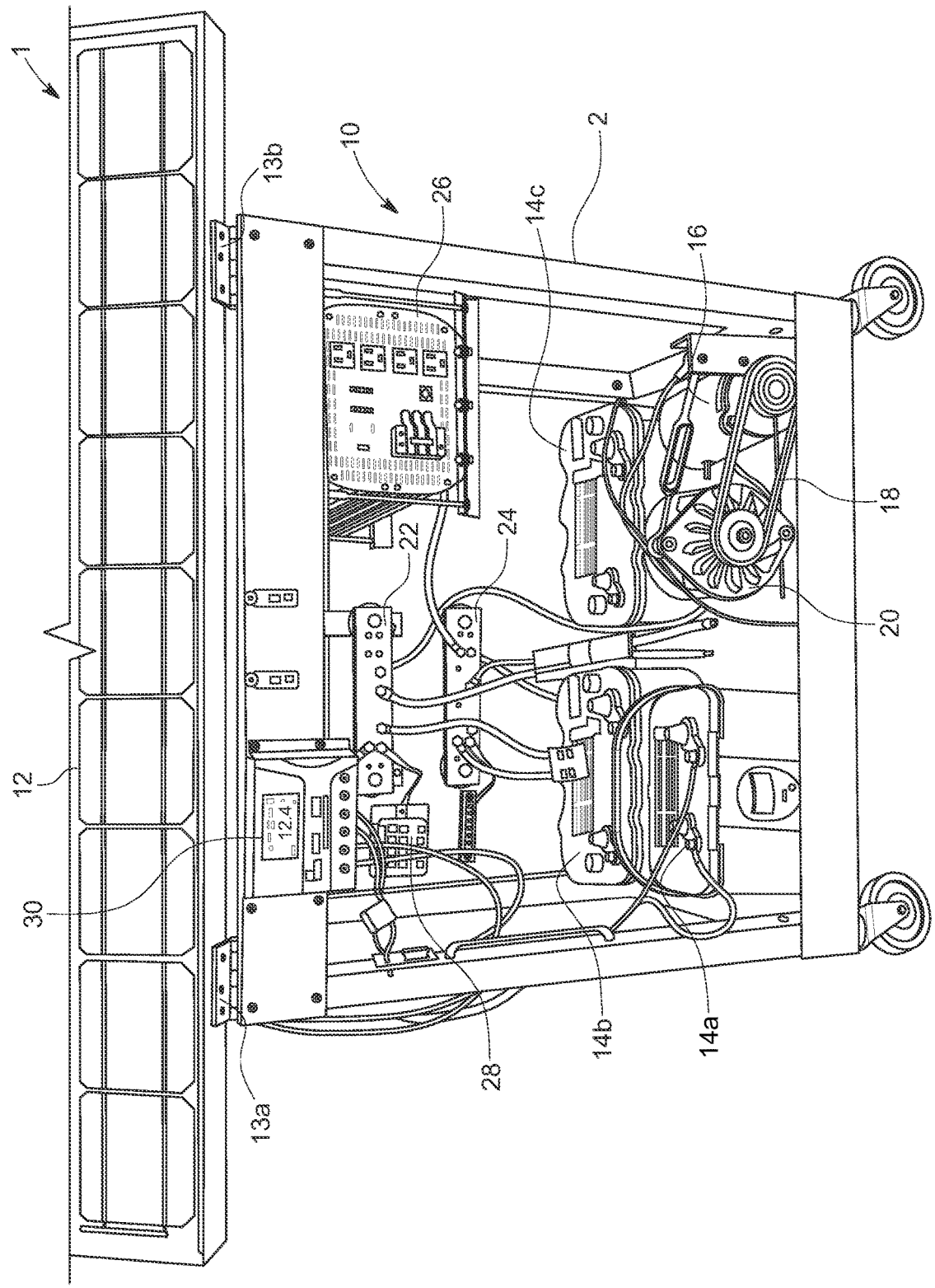
FIG. 1 is an illustration of a power system device implementing an example configuration of the solar electric hybrid power system.

FIG. 1 is an illustration of a power system device 1 implementing an example configuration of the solar electric hybrid power system 10. In an example of the solar electric hybrid backup power system 10, one or more solar panel 12 (e.g., an array of solar panels) is electrically connected to one or more deep cycle battery (DCB) 14a-c. The battery 14a-c is electrically connected to an electric motor 16. The electric motor 16 may operate a drive belt(s) 18 to turn one or more generator or alternator 20. In an example, the electric motor 16 powers multiple generators or alternators (e.g., one each in a Left and Right circuit).

The generator 20 is electrically connected to a positive bus bar 22 and a negative bus bar 24. The bus bars 22 and 24 may be connected to the DCBs (e.g., batteries 14a-b) that are configured to store electrical energy and return stored electricity to the bus bars 22 and 24 when electrical demand exceeds the electrical energy being supplied by the generator motor 18 driven by the solar panel and/or a backup battery (e.g., battery 14c).

In an example, each battery 14a-c is capable of storing 50 Amp-hours of electric charge and delivering up to 800 Amperes of peak current. It is noted that sealed, gel-type automotive batteries are leakproof and may be used in any orientation, although other types of batteries may be provided. The bus bars are also capable of providing high-Amperage DC power to an inverter 26 which provides AC power (e.g., a standard 110-volt household supply, or 220-volt supply). The inverter 26 may be electrically connected to a transformer (e.g., contained in the inverter box 26) that is configured to supply higher-voltage power (e.g., a standard 220-volt household supply, of the sort used for clothes dryers) or a step-down transformer configured to supply lower-voltage power (e.g., for charging portable electronics).

In an example, the positive and negative bus bars are attached to deep cycle batteries. The batteries are capable of storing the electrical energy when demand is low or zero, and releasing the electrical energy when demand exceeds the wattage supplied by the alternator and primary battery. The positive and negative bus bars are also connected to an inverter, which converts the 12-volt DC power to 120-volt AC power (e.g., for household use).

The positive and negative bus bars are then attached to three additional deep cycle batteries, which are capable of storing the electrical energy when demand is low or zero, and releasing the electrical energy when demand exceeds the wattage supplied by the alternator. The positive and negative bus bars are electrically connected to a four-outlet inverter. The inverter converts the 12-volt DC power of the bus bars to AC power, and in an example is capable of delivering 5,000-10,000 Watts.

The solar electric hybrid power system 10 may also include an electronics controller 30. The electronics controller 30 may include a computer controller for monitoring sensors (e.g., voltage sensors, daylight sensors, motor speed, electrical generation at the solar panel, electrical generation at the motor, etc.) and for controlling output (e.g., operating the drive motor, switching between a battery storage mode and a battery output mode).

The solar electric hybrid power system 10 may also include a voltage sensing relay (e.g., operating in cooperation with the controller 30) that monitors the voltage of the bus bars and controls the voltage of the bus bars. In an example, the relay starts the motor when bus bar voltage is 11.0 volts DC, and stops the motor when the voltage reaches 12.4 volts.

The solar electric hybrid power system 10 may also include an alternator/generator (e.g., 40 amp) to reduce the size, and torque required to turn the alternator or generator, increasing run time on the solar batteries.

The solar electric hybrid power system 10 may also include an auto reset breaker 28 (e.g., 50 amp) between the bus bars and the 220 volt ac voltage inverter to handle a hard start motor which could momentarily draw more than the electrical current output (e.g., 160 amps) of the combined circuit banks.

In an example, the modules may be built into a small utility trailer, with a main electrical breaker to provide a total of 220 volts, 160 amps output. Such a configuration makes the device a viable alternative to gas generators for emergency preparedness and disaster recovery, as it can run unattended for as long as needed. Single or double (or more) modules may also be provided in recreational vehicles, small cabins, or out-buildings (e.g., for agricultural or ranch properties).

It is noted that high-Amperage DC power may present a shock and fire hazard if not properly insulated and housed, while belt-driven generators may create a pinch or ensnarement hazard. In an example, the solar electric hybrid power system may be enclosed within a housing 2 that is compliant with relevant building codes, electrical codes, vehicular codes, and/or consumer product safety standards.

It is also noted that the solar panel(s) 12 may be adjustable (e.g., via hinges 13*a-b*). As such, the solar panel(s) 12 can be oriented to increase solar energy production.

This arrangement provides a number of advantages over solar power alone, in that electrical energy can be harvested at relatively low wattage when it is available (i.e., when sunlight impinges on the solar panel), and then stored such that it can be released at significantly higher wattage when needed.

Before continuing, it should be noted that the examples described above are provided for purposes of illustration, and are not intended to be limiting. Other devices and/or device configurations may be utilized to carry out the operations described herein.

Figure 2:
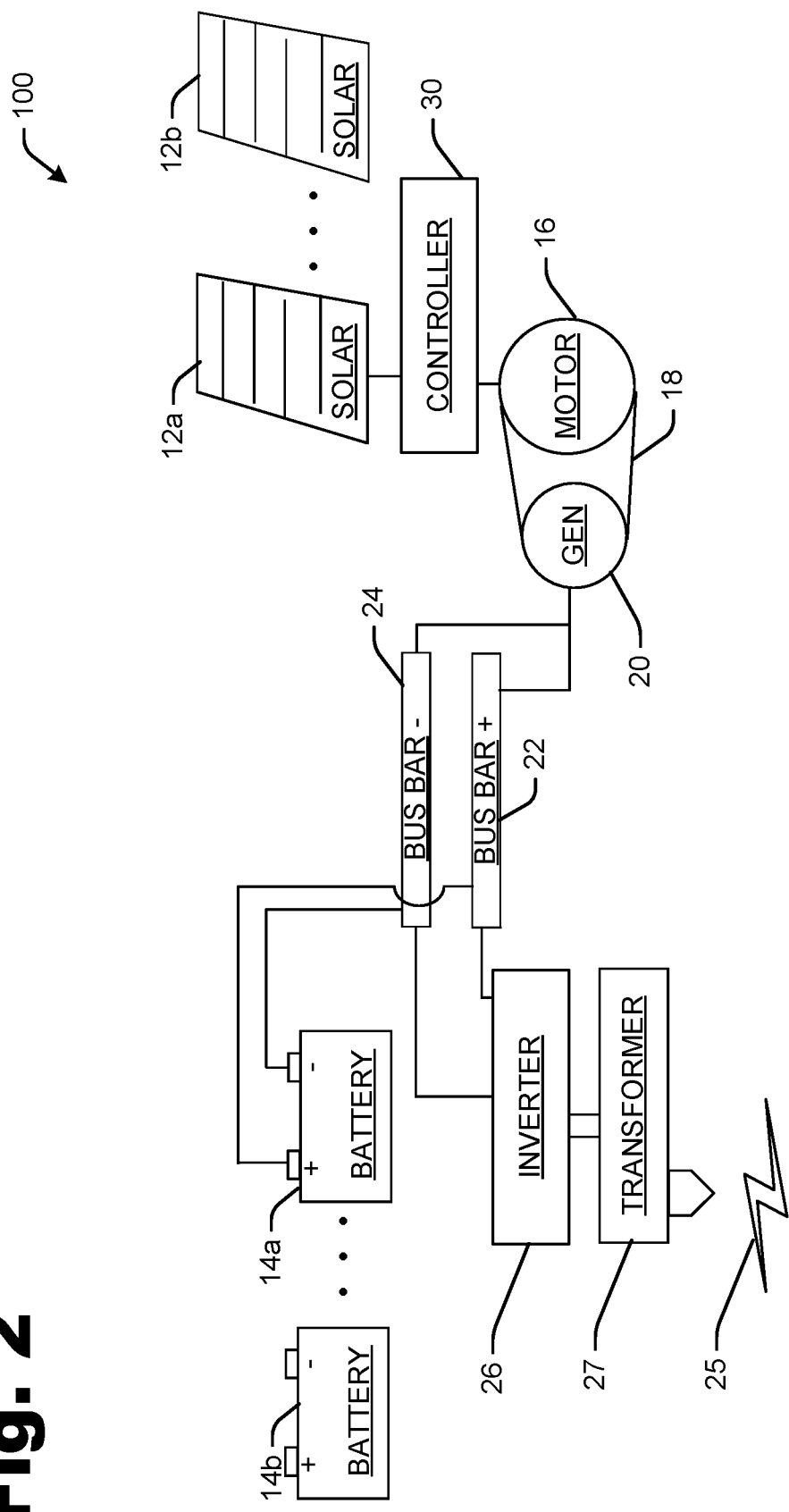
FIG. 2 is a schematic diagram of the example solar electric hybrid power system.

FIG. 2 is a schematic diagram 100 of the example solar electric hybrid power system 10. The example solar electric hybrid power system 10 includes one or more solar panel 12*a-b* electrically connected to one or more deep cycle battery (DCB) 14*a-b*. A controller 30 may be provided in this example to convert electrical energy from the solar panel(s) 12*a-b* into electrical current to power the motor 16. The electric motor 16 may operate a drive belt(s) 18 to turn one or more generator or alternator 20.

The generator 20 is electrically connected to a positive bus bar 22 and a negative bus bar 24. The bus bars 22 and 24 may be connected to the DCBs (e.g., batteries 14*a-b*) that are configured to store electrical energy and return stored electricity to the bus bars 22 and 24 when electrical demand exceeds the electrical energy being supplied by the generator motor 18 driven by the solar panel 12*a-b*. Electrical energy 25 may be delivered via inverter 26 and transformer 27 for use, e.g., to power lights and/or any other device(s) requiring electrical power.

In an example, each battery 14*a-b* is capable of storing 50 Amp-hours of electric charge and delivering up to 800 Amperes of peak current. It is noted that sealed, gel-type automotive batteries are leakproof and may be used in any orientation, although other types of batteries may be provided.

In an example, each of the solar panels 12*a-b* are capable of delivering up to 8.7 Amperes of current at 49.0 volts. The electric power is fed into a DC-to-DC converter that steps it down to 12.25 volts, with a maximum current of 34.5 Amperes.

In an example, the deep cycle batteries (DCBs) 14*a-b* are 12-volt, 55 Amp-hour batteries. The motor 16 is a 2,165 RPM motor capable of delivering 4.0 Amperes at zero load. The alternator 20 produces 12-volt DC power with a maximum peak current of 245 Amperes. The bus bars 22 and 24 provide 12-volt DC power with a maximum peak current of at least 400 Amperes. The inverter 26 is capable of supplying a peak power of 5,000-10,000 Watts.

Figure 3:
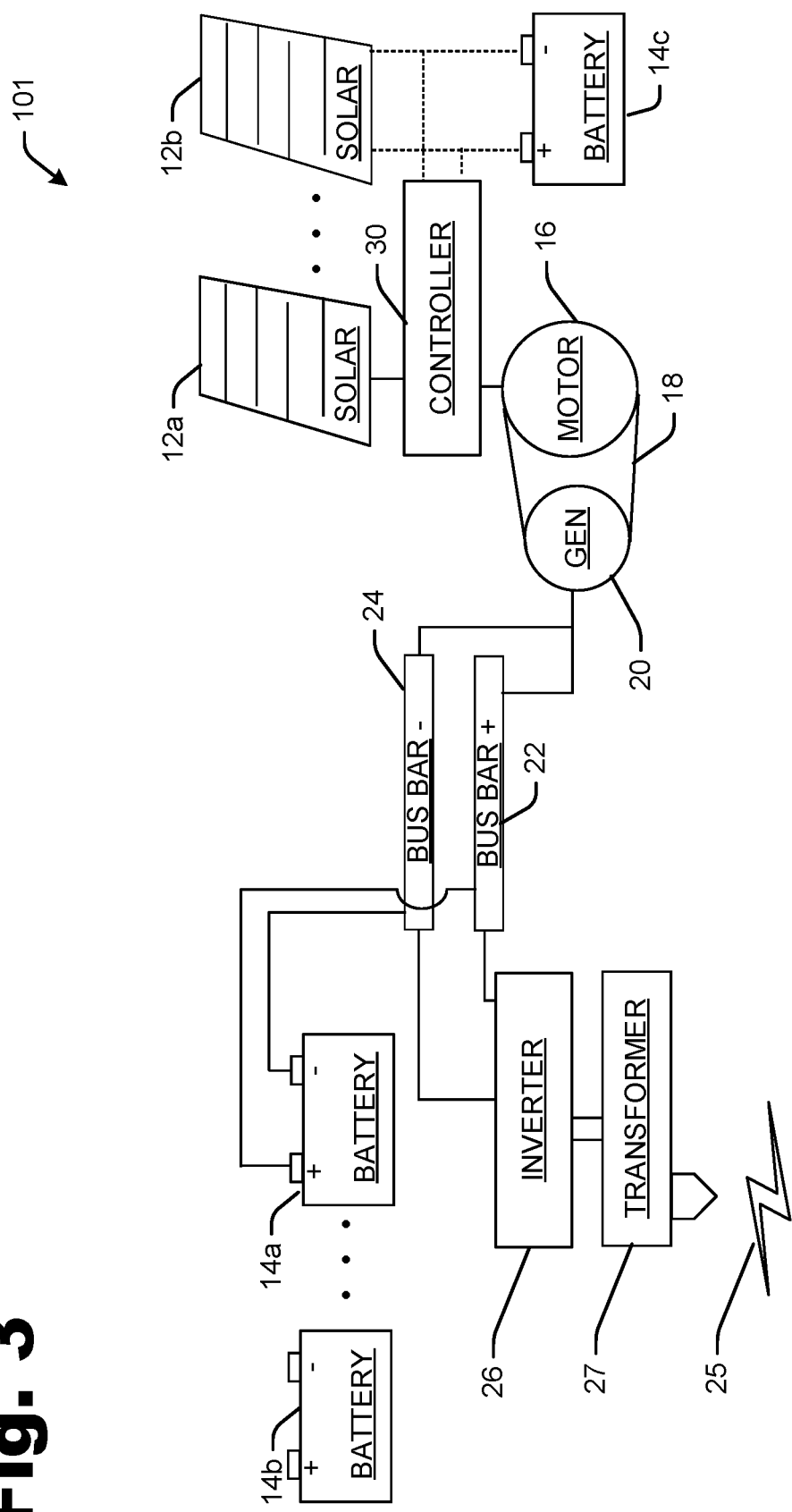
FIG. 3 is another schematic diagram of the example solar electric hybrid power system.

FIG. 3 is another schematic diagram 101 of the example solar electric hybrid power system 10. The example solar electric hybrid power system 10 includes one or more solar panel 12*a-b* electrically connected to one or more deep cycle battery (DCB) 14*a-b*. A controller 30 may be provided to convert electrical energy from the solar panel(s) 12*a-b* into electrical current to power the motor 16. The controller 30 may also be provided for other control operations, e.g., as mentioned above.

In this example, an additional battery 14*c* may be provided to aid in powering the electric motor and/or smooth power provided to the motor via the solar panel(s) 12*a-b*. The electric motor 16 may operate a drive belt(s) 18 to turn one or more generator or alternator 20.

In an example, the battery 14*c* is connected to the electric motor 16, which uses a drive belt 18 to turn the alternator 20 that generates electricity. Although not shown, the 12V output of the alternator 20 may also be connected through the positive and negative bus bars to provide additional 12V power to the motor 16. In this configuration, the majority of the power to the 12V bus comes from the battery when it is highly charged, while the majority comes from the alternator when the battery charge is low.

The generator 20 is electrically connected to a positive bus bar 22 and a negative bus bar 24. The bus bars 22 and 24 may be connected to the DCBs (e.g., batteries 14*a-b*) that are configured to store electrical energy and return stored electricity to the bus bars 22 and 24 when electrical demand exceeds the electrical energy being supplied by the generator motor 18 driven by the solar panel 12*a-b*. Electrical energy 25 may be delivered via inverter 26 and transformer 27 for use, e.g., to power lights and/or any other device(s) requiring electrical power.

Figure 4:
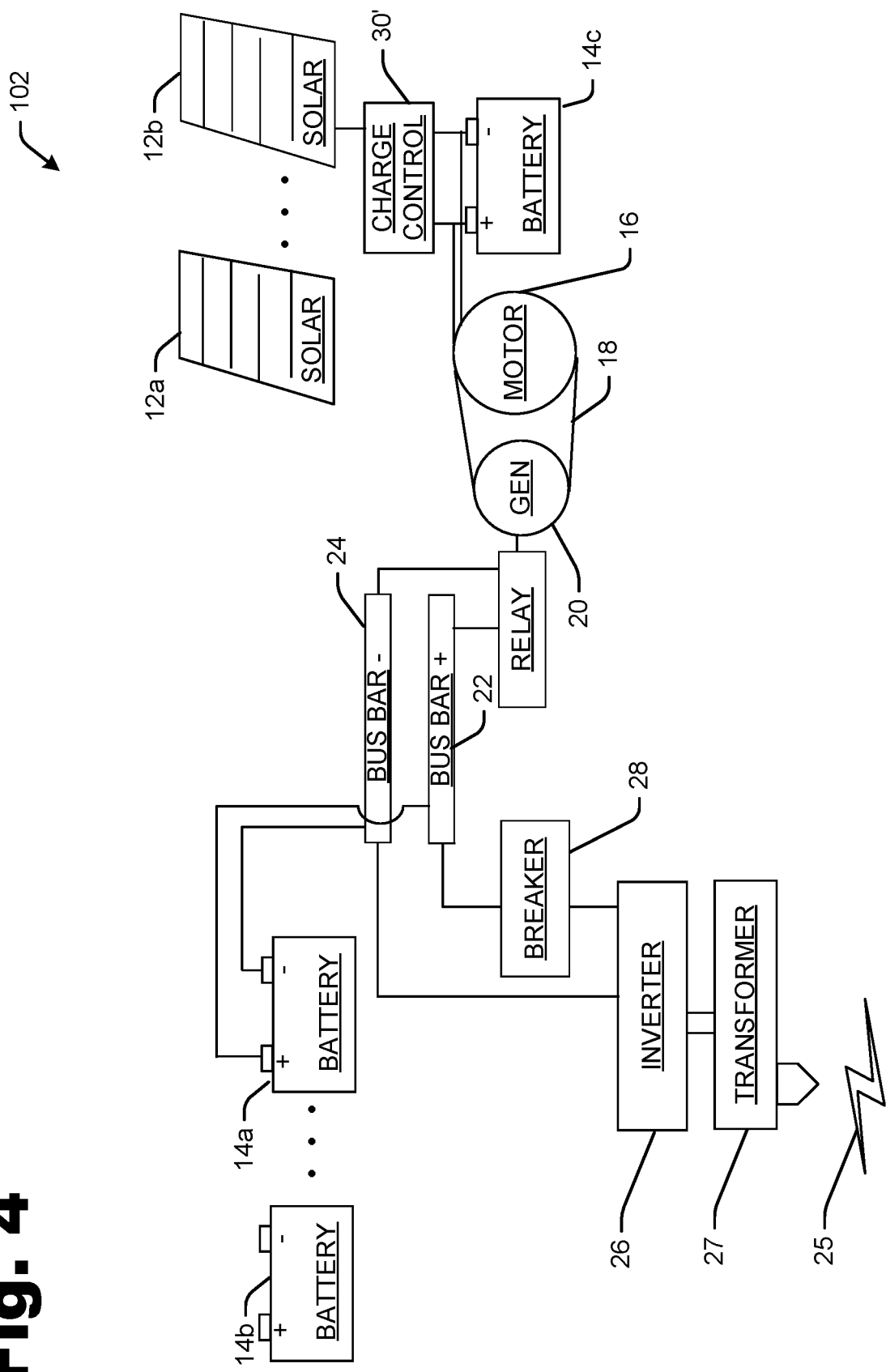
FIG. 4 is another schematic diagram of the example solar electric hybrid power system.

FIG. 4 is another schematic diagram 102 of the example solar electric hybrid power system 10. The example solar electric hybrid power system 10 includes one or more solar panel 12*a-b* electrically connected to one or more deep cycle battery (DCB) 14*a-b*. A charge controller 30' may be provided in this example to convert electrical energy from the solar panel(s) 12*a-b* into electrical current to power the motor 16. The electric motor 16 may operate a drive belt(s) 18 to turn one or more generator or alternator 20.

The generator 20 is electrically connected to a positive bus bar 22 and a negative bus bar 24. The bus bars 22 and 24 may be connected to the DCBs (e.g., batteries 14*a-b*) that are configured to store electrical energy and return stored electricity to the bus bars 22 and 24 when electrical demand exceeds the electrical energy being supplied by the generator motor 18 driven by the solar panel 12*a-b*. Electrical energy 25 may be delivered via inverter 26 and transformer 27 for use, e.g., to power lights and/or any other device(s) requiring electrical power.

Figure 5:
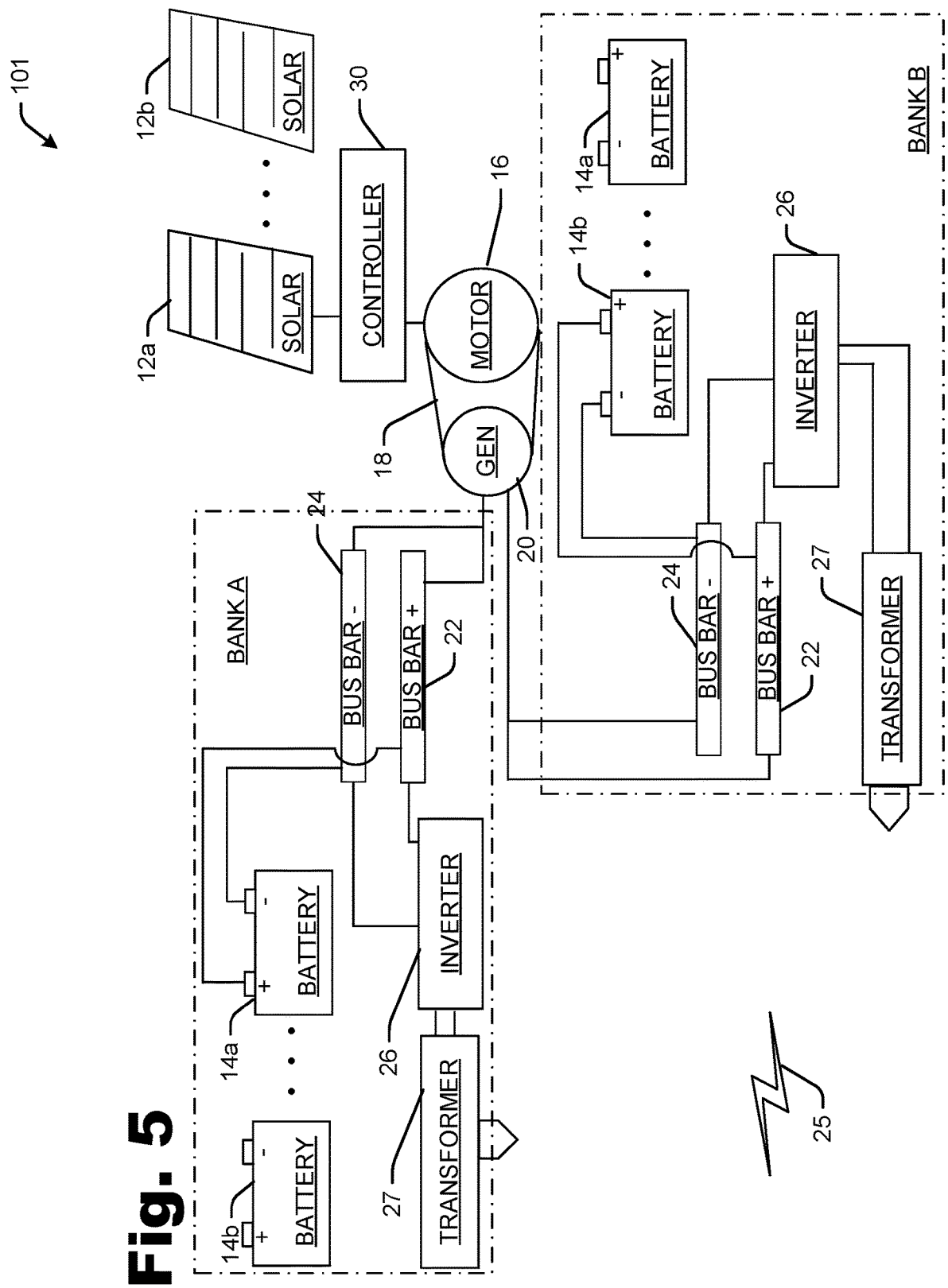
FIG. 5 is a schematic diagram of the example solar electric hybrid power system.

FIG. 5 is a schematic diagram 103 of the example solar electric hybrid power system 10. The example solar electric hybrid power system 10 includes one or more circuit banks (e.g., Bank A and Bank B). The solar panel 12a-b is electrically connected via controller 30 to convert electrical energy from the solar panel(s) 12a-b into electrical current to power the motor 16. The controller may also control other aspects, e.g., as mentioned above and/or the electric motor 16 may operate a drive belt(s) 18 to turn one or more generator or alternator 20.

The generator 20 is electrically connected to each circuit bank (Bank A and Bank B). The circuit banks have a positive bus bar 22 and a negative bus bar 24. The bus bars 22 and 24 may be connected to the DCBs (e.g., batteries 14a-b) that are configured to store electrical energy and return stored electricity to the bus bars 22 and 24 when electrical demand exceeds the electrical energy being supplied by the generator motor 18 driven by the solar panel 12a-b. Electrical energy 25 may be delivered via inverter 26 and transformer 27 for use, e.g., to power lights and/or any other device(s) requiring electrical power.

In this example, the solar panel is connected to a solar controller with an output of 12V at up to 7A. This power charges a primary deep cycle battery (e.g., a sealed gel automotive battery), which is connected to a voltage controller that delivers 12V power to the positive and negative bus bars.

In each of the Left and Right circuits, the alternator is electrically connected to positive and negative 12V bus bars. The bus bars are electrically connected to multiple deep cycle batteries. The 12V bus bars are also electrically connected to a 4-outlet, 110-volt power inverter that is capable of providing electricity in the same format as a normal household wall outlet.

The configurations and operations shown and described herein are provided to illustrate example implementations. It is noted that the operations are not limited to the ordering shown. Still other configurations and operations may also be implemented. Different numbers of batteries, different numbers of solar panels, and different wiring arrangements may be provided that perform the desired function. Furthermore, instead of mechanical coupling between the motor and alternator or generator being via a drive belt, this coupling may be accomplished through gears, pulleys, wheels, a clutch mechanism, direct axial connection, or other mechanical methods that are known in the art.

It is noted that the examples shown and described are provided for purposes of illustration and are not intended to be limiting. Still other examples are also contemplated.

The invention claimed is:

1. A method of providing electricity, comprising:
    collecting photovoltaic energy with one or more photovoltaic panels;
    converting the photovoltaic energy by a charge controller into electricity for storage at a primary battery;
    driving a motor of a generator with the electricity from the one or more photovoltaic panels via the primary battery;
    conveying electrical energy from the generator to a positive bus bar and a negative bus bar, such that there is a voltage between the positive bus bar and the negative bus bar;
    electrically coupling a bank of secondary batteries to the positive bus bar and the negative bus bar such that the secondary batteries are charged and discharged through the positive bus bar and the negative bus bar;
    supplying the electrical energy through one or more electrical outlets that are electrically coupled to the positive and negative bus bars; and
    monitoring and controlling voltage of the positive bus bar and the negative bus bar with a voltage sensing relay.

2. The method of claim 1, further comprising providing direct current (DC) electricity through the one or more electrical outlets connected to the positive bus bar and the negative bus bar.

3. The method of claim 1, further comprising passing electrical energy from the positive bus bar and the negative bus bar through an inverter and supplying the electrical energy as alternating current (AC) electricity through one or more standard AC electrical outlets.

4. The method of claim 1, further comprising connecting electrical energy through a voltage regulator, transformer, or DC-DC converter.

5. The method of claim 1, further comprising enclosing moving parts and exposed wiring within a housing.

6. The method of claim 1, wherein the motor and generator are mechanically coupled via a belt drive.

7. A device for supplying electrical power, comprising:
    one or more photovoltaic panels configured to generate electricity;
    an electric motor electrically operated by the electricity generated by the one or more photovoltaic panels;
    a generator mechanically coupled to the electric motor;
    a positive bus bar and negative bus bar electrically coupled to the generator;
    at least one battery electrically coupled to the positive bus bar and negative bus bar;
    at least one electrical outlet electrically coupled to the positive bus bar and negative bus bar; and
    a voltage sensing relay to monitor and control voltage of the positive bus bar and the negative bus bar;
    wherein electrical energy is stored in the at least one battery coupled to the positive bus bar and the negative bus bar when a supply from the generator exceeds a demand on the at least one electrical outlet; and
    wherein electrical energy is discharged onto the positive bus bar and the negative bus bar from the at least one battery when the demand on the positive bus bar and the negative bus bar exceeds the supply from the generator alone.

8. The device of claim 7, further comprising a primary battery charged by the one or more photovoltaic panels, the primary battery at least partly powering the electric motor.

9. The device of claim 7, further comprising an inverter electrically coupled between the positive bus bar and the negative bus bar and the at least one electrical outlet, such that the at least one electrical outlet supplies AC electricity.

10. The device of claim 7, further comprising a second circuit having an additional positive bus bar and negative bus bar, and the second circuit having associated batteries and electrical outlets, the second circuit connected to the generator.

11. The device of claim 7, further comprising at least one of a voltage regulator, transformer, and a DC-DC converter, electrically coupled to at least one of the one or more photovoltaic cells, the positive bus bar and the negative bus bar, and the one or more electrical outlets, such that voltage irregularities in the one or more electrical outlets are smoothed.

12. The device of claim 7, further comprising enclosing moving parts and exposed wiring within a housing.

13. The device of claim 7, wherein the electric motor and generator are mechanically coupled via a belt drive.

14. The device of claim 7, wherein multiple generators are mechanically coupled to the electric motor.

15. The device of claim 7, further comprising a controller to monitor at least one sensor and control operation of the electric motor in response to input from the at least one sensor.

16. The device of claim 7, wherein the voltage sensing relay starts the electric motor at a first predetermined bus bar voltage and stops the electric motor when voltage of the positive bus bar and the negative bus bar reaches a second predetermined bus bar voltage.

17. A device for supplying electrical power, comprising:
   at least one photovoltaic panel;
   an electric motor electrically powered by the at least one photovoltaic panel;
   a generator mechanically coupled to the electric motor;
   a positive bus bar and a negative bus bar electrically coupled to the generator;
   at least one electrical outlet electrically coupled to the positive bus bar and the negative bus bar;
   a controller coupled with the positive bus bar and the negative bus bar and configured to store electrical energy in a battery; and
   a voltage sensing relay that monitors and controls voltage of the positive bus bar and the negative bus bar;
   wherein the electrical energy is stored when supply from the generator exceeds demand on the at least one electrical outlet, and the electrical energy is discharged when the demand on the at least one electrical outlet exceeds a supply from the generator.

18. The device of claim 17, wherein the voltage sensing relay starts the motor at a first predetermined bus bar voltage and stops the motor when voltage of the positive bus bar and the negative bus bar reaches a second predetermined bus bar voltage.

19. The device of claim 17, further comprising an auto-reset breaker between the positive bus bar and the negative bus bar and the inverter.

20. The device of claim 19, wherein the auto-reset breaker is configured to handle a hard start motor momentarily drawing more electric current than electrical current output of all circuits.

* * * * *